Figure 1:
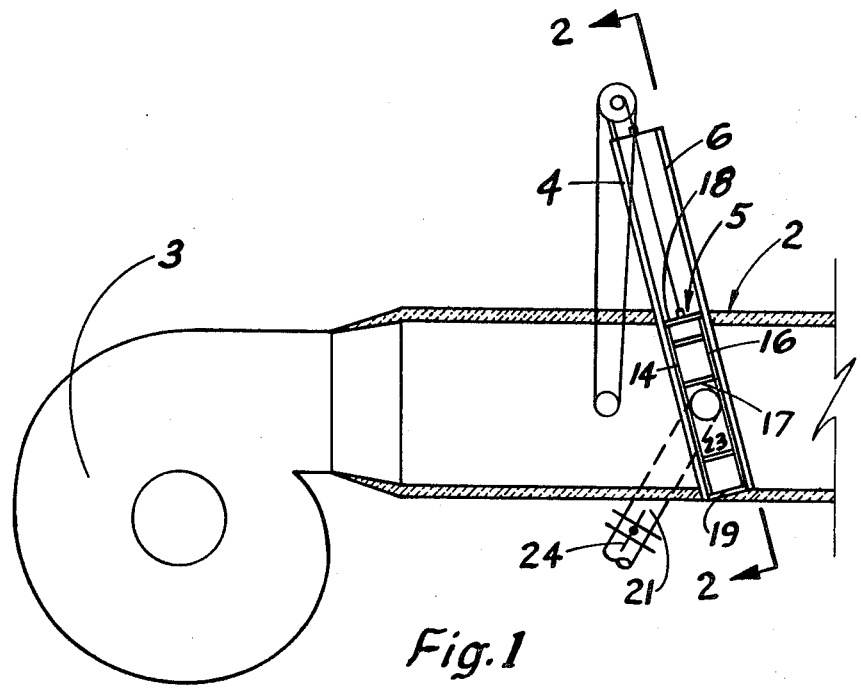

United States Patent

[11] 3,602,165

| | | |
|---|---|---|
| [72] | Inventor | Robert G. Huntington<br>Louisville, Ky. |
| [21] | Appl. No. | 875,143 |
| [22] | Filed | Nov. 10, 1969 |
| [45] | Patented | Aug. 31, 1971 |
| [73] | Assignee | American Air Filter Company, Inc.<br>Louisville, Ky. |

[54] DAMPER ASSEMBLY
3 Claims, 2 Drawing Figs.

[52] U.S. Cl. .................................................. 110/163,
126/285
[51] Int. Cl. ..................................................... F23l 13/06
[50] Field of Search .......................................... 110/163;
126/285

[56] References Cited
UNITED STATES PATENTS

| | | | |
|---|---|---|---|
| 1,872,434 | 8/1932 | Fahrenwald.................. | 126/285 |
| 2,148,713 | 2/1939 | Roof............................ | 126/285 |
| 3,228,389 | 1/1966 | Lowe et al. .................. | 126/285 |

FOREIGN PATENTS 495,118  4/1930  Germany

*Primary Examiner*—Edward G. Favors
*Attorney*—Ralph B. Brick

ABSTRACT: An isolation damper assembly for a gas-conducting conduit including a hollow primary damper structure movable to extend transverse the gas-conducting conduit in closed position, the gas-conducting conduit including a venting conduit communicably connected with the hollow primary damper structure to vent the same when in closed position.

PATENTED AUG 31 1971 3,602,165

INVENTOR.
ROBERT G. HUNTINGTON
BY Ralph B. Brick
ATTORNEY

DAMPER ASSEMBLY

BACKGROUND OF THE INVENTION

The present invention relates to damper structures, and more particularly to a damper structure assembly for use in gas-conducting conduits in metallurgical operations.

In large gas-conducting conduit systems such as those used in conjunction with metallurgical operations, it frequently is necessary to provide a damper assembly to control gas flow through the conduit.

In the past, these damper assemblies have proven to be considerably complicated and expensive in order to effect positive tight sealing, and in many instances, have not proven entirely effective. Included among the past damper arrangements have been hollow dampers which have been utilized to reduce weight problems, and to permit cooling fluid circulation, as well as to effect pressure sealing. However, even these past hollow damper assembly arrangements have not proven entirely satisfactory from either an economic or an operating standpoint.

SUMMARY OF THE INVENTION

The present invention provides an isolation damper assembly for a gas-conducting conduit which utilizes the principle of the hollow damper structure to obtain the past advantages thereof, and at the same time, provides a more effective gas flow control in the conduit with a minimum of parts and a minimum of expense.

Various other features of the present invention will become obvious to one skilled in the art upon reading the disclosure set forth hereinafter.

More particularly, the present invention provides an isolation damper assembly for gas-conducting gas-conducting comprising: a damper-receiving guide frame means disposed along peripheral interior of the gas conducting conduit; damper slot means in the gas-conducting conduit communicating with the guide frame means; primary damper means including spaced parallel damper plates adapted to be inserted through the damper slot means along the guide frame means to extend transverse the gas flow path in the gas-conducting conduit and define a transverse chamber thereacross; venting conduit means connected to the gas-conducting conduit to communicate with the transverse chamber; and secondary damper means cooperative with the venting conduit means to be in open position when the primary damper means is in closed position to vent the transverse chamber.

It is to be understood that various changes can be made in the arrangement, form, and construction of the apparatus disclosed herein without departing from the scope or spirit of the present invention.

Figure 2:
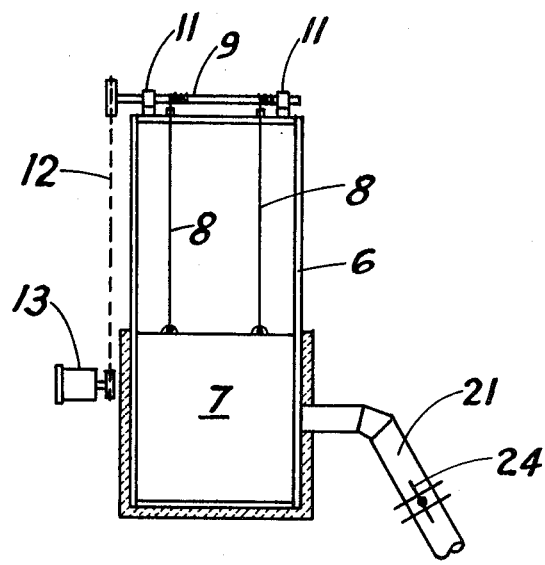

Referring to the drawing which discloses one advantageous embodiment of the present invention;

FIG. 1 is a cross-sectional elevational view of a gas-conducting conduit connected at one end to a fan and having the novel damper assembly of the present invention disposed in the conduit; and FIG. 2 is a sectional view taken in a plane passing through line 2—2 of FIG. 1.

Referring to FIG. 1 of the drawing, gas-conducting conduit 2 is disclosed as being connected at one end to positive pressure fan 3. As further disclosed in the drawing, gas-conducting conduit 2 can be rectangular in cross section to include a slot 5 at the top portion thereof through which can be inserted spaced rectangular flow-through guide frames 4 and 6. Guide frames 4 and 6 are arranged to extend transverse the gas flow path in gas conducting conduit 2 along the peripheral interior of the conduit. Advantageously, the guide frames 4 and 6 are disposed at an incline to the longitudinal axis of conduit 2 to permit gravitational movement of damper assembly 7 (disclosed hereinafter) to closed position. Mounted between the guide frames 4 and 6 is primary damper assembly 7. Damper assembly 7 is slidably movable along the guide frames from an open position outside gas-conducting conduit 2 to a closed position within the gas-conducting conduit.

To effect this movement, cables 8 are connected at one of their respective ends to the upper portion of damper 7 and are connected at their other ends to a winch 9 mounted on top of the guide frames by means of bearing boxes 11. Winch 9 can be driven through a sheave and endless cable assembly 12 connected to reversible motor 13 to thus move damper assembly 7 between an open and closed position.

As will be noted in FIG. 1, damper assembly 7 is hollow in nature and includes two parallel plates 14 and 16 spaced apart by means of suitable spacer 17 and upper and lower plates 18 and 19.

In accordance with the present invention, a venting conduit 21 which can be connected to a suitable fan or negative source (not shown) is also connected to gas-conducting conduit 2 to communicate with transverse chamber 23 formed between plates 15 and 16 when the damper is in closed position. Venting conduit 21 includes pivotally mounted secondary damper 24 which is cooperative with the venting conduit to be in open position when the primary damper assembly 7 is in closed position to thus vent the transverse chamber 23. When the damper assembly 7 is in open position, venting conduit 21 is closed to prevent any venting of gases therethrough.

Thus, with the arrangement aforedescribed, a loose operating and inexpensive damper assembly is provided to prevent backflow of gases from a positive to a zero pressure side.

The invention claimed is:

1. An isolation damper assembly for gas-conducting conduit comprising: a damper receiving flow-through guide frame means disposed along the peripheral interior of said gas-conducting conduit; damper slot means in said gas-conducting conduit communicating with said guide frame means; primary damper means including spaced parallel damper plates adapted to be inserted through said slot means along said guide frame means to extend transverse the gas flow path in said gas-conducting conduit, defining a transverse chamber; a venting conduit connected to said gas conducting conduit to communicate with said transverse chamber; and secondary damper means cooperative with said venting conduit to be in open position when said primary damper means is in closed position to vent said transverse chamber.

2. The apparatus of claim 1, said guide frame means extending through said slot means to support said primary damper means at a position externally of said gas-conducting conduit; said parallel plates of said damper means being joined together to form a hollow sandwich damper; and a cable and winch assembly connected to said primary damper means for actuating said primary damper means into open and closed position.

3. The apparatus of claim 2, said guide frame means disposed at an incline along the peripheral interior of said gas-conducting conduit to permit gravitational movement of said primary damper into closed position.